F. B. RICHARDSON.
Enema Syringe.
No. 7,946. Reissued Nov. 13, 1877.
Fig. 5.
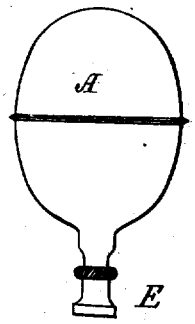
Fig. 2.
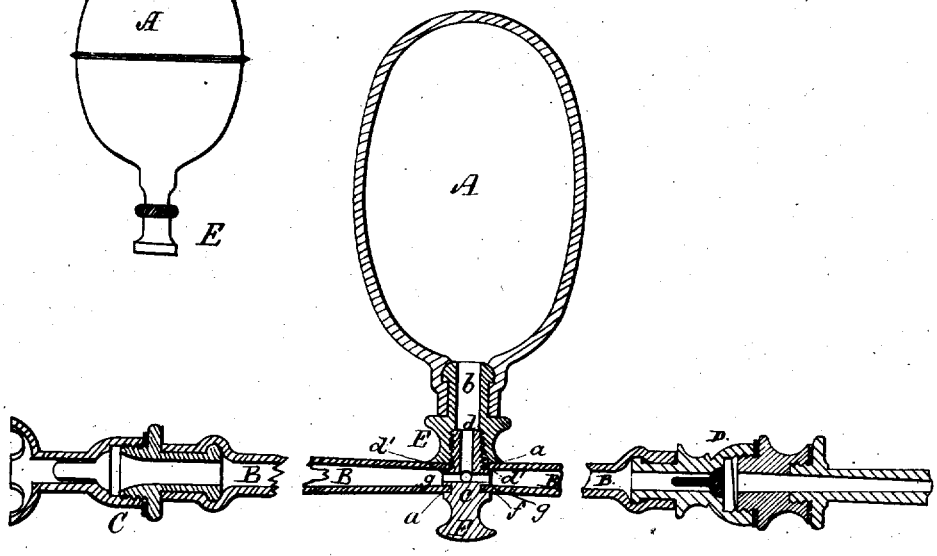
Fig. 1.
Fig. 3.
Fig. 4.
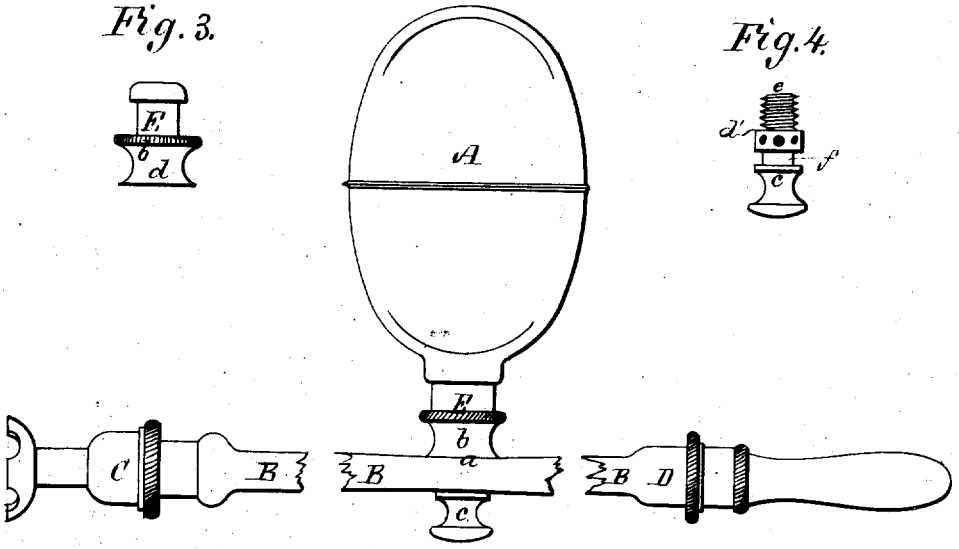
Witnesses.
F. Hunnewell.
W. C. Boardman.
Inventor.
F. B. Richardson.
G. Curtis. Atty.
N. PETERS, PHOTO-LITHOGRAPHER, WASHINGTON, D. C.

UNITED STATES PATENT OFFICE.

FRANCIS B. RICHARDSON, OF BOSTON, MASSACHUSETTS.

IMPROVEMENT IN ENEMA-SYRINGES.

Specification forming part of Letters Patent No. 31,626, dated March 5, 1861; Reissue No. 7,946, dated November 13, 1877; application filed August 4, 1877.

*To all whom it may concern:*

Be it known that I, FRANCIS B. RICHARDSON, of Boston, Suffolk county, State of Massachusetts, have invented a new and useful Improvement in Enema-Syringe, of which the following is a specification:

The drawings accompanying this specification represent, in Figure 1, a front elevation, and in Fig. 2 a longitudinal section, of an elastic-bulb enema-syringe provided with my invention. Figs. 3 and 4 are separate views of the two parts of the metallic connection by which the elastic bulb and conduit are joined together. Fig. 5 represents the bulb alone, detached from the syringe.

My invention relates to enema-syringes in which an elastic bulb is employed as the agent to cause the passage of liquid through the tube or conduit of the syringe. I connect the bulb with the other part or parts of the syringe by means of a two-part connection, the one part attached to the bulb, the other part to the main portion of the syringe, the two parts being adapted to screw together, so as to connect properly the bulb with the tube or conduit leading to the valve-chambers of the syringe. It is in this feature that my invention, in the main, consists.

I also combine the parts above specified in the manner hereinafter described, whereby the elastic bulb, with its part of the metallic connection, can be bodily removed, and applied to or used with other forms of pipe, thus adapting the syringe to all the various operations for which it may be required.

My invention also enables me to use readily a single flexible and elastic conduit instead of two or more such separate conduits or pipes, as heretofore, and it is in that connection that I shall herein represent and describe it.

In carrying out my invention with one single flexible and elastic conduit, instead of two such separate conduits or pipes of induction and eduction, as heretofore employed, I not only construct such conduit with a lateral perforation carried through its two opposite sides, but extend the metallic connection of the bulb through such perforation, and so form the parts that the elasticity of the conduit or pipe around the perforation may cause the latter to close or fit so about the extension of the metallic connection as to make therewith a tight joint or joints. I also make the metallic connection with one or more lateral passages, to open into the bore of the elastic conduit and that of the said connection.

In the drawings, A denotes the elastic bulb. B is a caoutchouc elastic and flexible single pipe, which, at its two extremities, is connected with the valve-chambers C D. This pipe is made with a lateral perforation, *a*, which should lead through opposite sides of it, and into its bore. The metallic connection E, on which the bulb is fixed, opens into the bulb, passes into such perforation, and opens into the bore of the tube, the perforation being made of a diameter less than that of the part received by it. By so making such perforation the elasticity of the material of which the tube may be composed will cause the tube to close tightly on the part extended through it, and thus form therewith a tight joint or joints.

For the better security of tightness of the joint at the upper part of the perforation, and for other purposes, I construct the metallic connection in two parts, *b c*, and with screws *d e*, by which they may be joined together.

The male screw portion *c* I form with a shoulder, *d'*, extending around it at the base of the screw. On this shoulder the tube about the perforation rests, and, besides, it is pressed against the shoulder by the female-screw part *d* when the two parts *b c* are coupled together. In this way not only is a tight joint insured at the upper part of the perforation, but the pipe is maintained in place under a downward bend or strain on it.

I consider an important feature of my invention to consist in the metallic connection E as formed in two parts screwed together by means of a male screw on one part and a female screw on the other, and inserted, respectively, in or applied to the elastic bulb and the tube or connection of the valve-chambers.

The part *c* may also have a groove extending around it to receive the lower part *g* of the pipe, which should be sprung into such groove. In this way the joint may be made closer than it can be without the groove.

In some respects my mode of applying the elastic bulb and its flexible pipe of induction and eduction is preferable to that which is usually termed a "threefold metallic connection"—that is, such as is described and represented in a patent granted to me and another, May 8, 1860—for a threefold metallic connection, when constructed and applied as shown in such patent, requires two separate flexible pipes, whereas, with my invention, as represented in the drawings, but one flexible pipe is employed.

Furthermore, by making my metallic connection in two parts, *b c*, constructed and screwed together as described, the upper part answers, when it and the bulb are removed together, as shown in Fig. 5, from the lower part, to receive a small terminal jet-tube, such as will be suitable for injecting a liquid either into the urethra or the eye or ear of a person, and thus the bulb with such small tube may be employed as a syringe for delicate operations.

By employing one single flexible and elastic conduit, applied to the bulb as hereinbefore described, I not only obtain close joints, but a stronger connection than is the case when two flexible conduits are applied to a threefold inelastic connection, as above described.

I do not herein claim such a threefold metallic connection and two separate flexible pipes used in combination, and as a means of joining the elastic bulb with the valve-cases of an enema-syringe; nor do I claim for such purpose a single elastic and flexible tube, B, having a lateral perforation made entirely through it transversely to its axis, and with the metallic connection so made and applied to such tube, or through a swell or bulb of the tube, as to make, with the tube, and by means of teats or projections from such connections, tight joints.

By the system of interchangeable pipes with the bulb which the use of the two-part connection E renders possible a variety of syringes with one bulb is obtained.

I claim—

1. The elastic bulb open at one end only, and the syringe tube or conduit, in combination with a two-part tubular metallic connection attached the one part to the bulb and the other part to the syringe tube or conduit, and adapted to be joined so as to put the tube or conduit and the bulb in communication, substantially as set forth.

2. The bulb-and-tube connection, made in two separate tubular parts, *b c*, respectively inserted in or applied to an elastic bulb open at one end only, and to the tube or connection of the valve-chambers, and so as to operate therewith, or connect the bulb and valve-chambers, substantially in the manner and for the purpose described.

3. A syringe having a removable elastic bulb open at one end only, and provided at that end with a screw-threaded metallic connection, which is adapted to be detachably connected with a corresponding part on the syringe, and can be used interchangeably with different forms of pipes, substantially as set forth.

FRANCIS B. RICHARDSON.

Witnesses:
W. E. BOARDMAN,
LOUIS A. CURTIS.